United States Patent [19]

Hawkins

[11] 3,984,211
[45] Oct. 5, 1976

[54] APPARATUS FOR SEVERING A LENGTH FROM A STRIP OF RUBBER TIRE TREAD
[75] Inventor: James H. Hawkins, Muscatine, Iowa
[73] Assignee: Bandag Incorporated, Muscatine, Iowa
[22] Filed: Mar. 27, 1975
[21] Appl. No.: 562,685

[52] U.S. Cl. .................................. 51/5 C; 83/488; 156/96; 425/304
[51] Int. Cl.² .................... B24B 19/22; B29H 17/36
[58] Field of Search ............ 51/181 R, 5 C; 29/566; 83/487, 488, 508; 156/96, 153; 425/304

[56]        References Cited
          UNITED STATES PATENTS

| | | | |
|---|---|---|---|
| 1,269,653 | 6/1918 | Smith | 51/181 X |
| 2,382,257 | 8/1945 | Ramsay | 51/181 X |
| 2,524,323 | 10/1950 | Lloyd et al. | 51/181 X |
| 2,777,521 | 1/1957 | Tanis | 83/488 X |
| 3,207,016 | 9/1965 | Huff | 83/488 X |
| 3,207,019 | 9/1965 | Vanzo et al. | 83/488 X |
| 3,762,259 | 10/1973 | Kuts | 83/488 X |

*Primary Examiner*—Al Lawrence Smith
*Assistant Examiner*—Nicholas P. Godici
*Attorney, Agent, or Firm*—Cushman, Darby & Cushman

[57]                 ABSTRACT

A circular rotatably driven knife assembly for cutting strips including a carriage for supporting the cutting knife and drive means for the carriage and knife. The knife structure has particular utility for cutting strips of vulcanized rubber such as the tread material adapted to be bonded to the outside of a tire casing, the knife having abrasive grits bonded to its side walls adjacent its periphery to buff the ends of the strip simultaneously with the cutting operation to condition the ends cut off of the portion of the strip for splicing during the vulcanizing step after the severed end of the strip has been wrapped around the tire with the ends pressed into contact with each other.

2 Claims, 3 Drawing Figures

APPARATUS FOR SEVERING A LENGTH FROM A STRIP OF RUBBER TIRE TREAD

BACKGROUND OF THE INVENTION

In the manufacture of tires and more particularly when tires are being recapped, long strips of rubber material to be used for the ultimate tread on the tire are supplied to the recapping plant. The strip is then cut to provide a length of a vulcanized rubber composition to form a new tread to be applied to the tire carcass. In order to condition the rubber material for better bonding during the vulcanizing step, it has been the practice heretofore to buff the ends of the strip that are pressed into contact prior to vulcanization. Thus in the past, after a length of the tread material had been cut from the strip, the two ends were abraded or buffed to roughen the ends and clean the butting surfaces to improve the bonding during the vulcanizing step.

Circular cutting knives have been used for such cut-off operations, the knives being rotatably driven while supported in carriage means moved transversely across the vulcanized strip to be cut. Various structures for mounting and driving rotatable knives are known for cutting various kinds of products. Also circular saw means are known such as the structure shown in U.S. Pat. No. 2,524,323 to Lloyd et al. This is a dual purpose saw with a sanding surface integral therewith.

BRIEF DESCRIPTION OF THE INVENTION

The present invention is an improvement on power driven cutting knife means for use in severing a length of tread material from a strip of vulcanized rubber. The knife means preferably includes layers of abrasive grits bonded to its opposite side walls immediately next to its cutting edge for the purpose of simultaneously abrading the severed surfaces of the strip as the material is being parted by the knife. The buffed ends are then adapted to be placed into abutting contact when the length of tread material is applied to the tire casing so that the overall process can be speeded up with a proper quality of bond produced by vulcanizing the tread with the buffed ends in contact. The simultaneous cutting and buffing operation completed by using the herein disclosed knife means, in effect, eliminates the necessity of performing a separate buffing operation.

IN THE DRAWINGS

DETAILED DESCRIPTION

Figure 1:
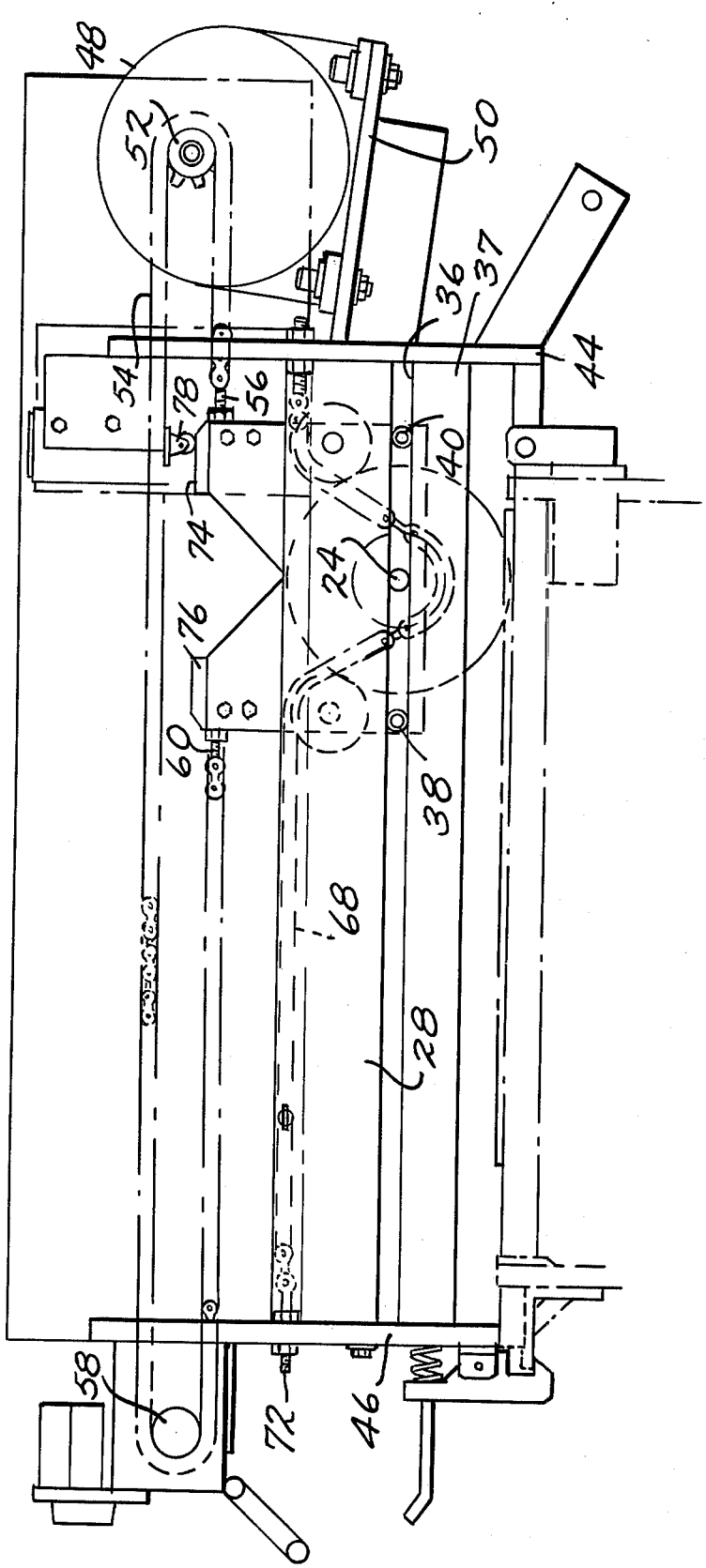
FIG. 1 is a front elevation of the main frame and reciprocating rotary knife supporting carriage slidably mounted thereon for carrying this knife of this invention.

The knife means of the preferred form here shown constitutes a circular blade 10 adapted to be rotatably driven by movement of a carriage 12 as will appear more fully below. The blade of the knife has a sharpened cutting edge 14 on its periphery and the side walls 16 and 18 each have an annular abrasive section 20 and 22 respectively bonded thereto. The annular sections 20 and 22 extend inwardly toward the center of the circular blade from the base of the peripheral cutting edge and serve to abrade the severed end surfaces on both sides of the cut in the strip as the knife is rotatably driven to cut-off a length of vulcanized rubber to be used, for example, in a recapping process. The circular blade 10 may be, for example, 6 inches in diameter, and the width of the annular sections in the radial direction may be between 0.15 inch and 0.5 inch. The abrasive coating may be 0.003 to 0.004 inches thick in the axial direction. The coating preferably is formed of grit of 180–200 grit size bonded to the surfaces of the blade 10. The grit may be alumina or any of the conventional carbides, such as tungsten carbide or silicon carbide. It has been found that an abrasive buffing action performed on the surfaces of the material to be joined together during vulcanization improves the bond and the knife here shown is adapted to simultaneously cut and buff the severed ends of such a strip, in one operation. Heretofore severing and buffing were performed as separate and distinct steps.

The rotary knife blade is mounted in the carriage 12 to rotate about axle 24 and the carriage is mounted to move longitudinally across a table for supporting the strip to be cut, the carriage sliding between vertical bearing walls 26 and 28 carried in a suitable supporting framework, the bearing walls engaging the upper side walls of the carriage 12. Bearing walls 30 and 32 also supported from the framework are provided for guiding the lower side walls of carriage 12. The pairs of vertical bearing walls 26 and 28 are fixed to the main support frame in positions to be spaced from walls 30 and 32 to, in effect, form slots or bearing ways 34 and 36. The carriage 12 has bearing rollers 38 and 40 rotatably supported on the lower portion of one side wall to ride in bearing way 36 and a corresponding pair of spaced apart bearing rollers on the other side of the carriage to engage in bearing way 34 to guide the carriage in its horizontal reciprocating path across the cutting station or table to cut the strip of vulcanized rubber material 42 supported under the knife from edge to edge.

The framework for supporting bearing walls, 26, 28, 30 and 32 includes end posts 44 and 46 that in turn are supported from means fixedly clamped onto the base of the machine.

The carriage 12 is reciprocably driven along a path that extends from one end of the support frame to the other, or a part of that distance if strips with narrower widths are to be cut, by means of the motor 48 mounted on platform 50 supported on the post 44. The motor 48 is reversible and drives the sprocket wheel 52 that interfits with sprocket chain 54. Chain 54 is an elongated section of chain that has one end connected to one side of carriage 12 by the adjustable bolt 56, the chain being trained over the idler sprocket 58 to have its other end connected by adjustable bolt 60 to the other side of carriage 12. When the chain has been properly tensioned over sprockets 52 and 58, it is apparent that motor 48 may be energized to rotate in one or the other direction to drive carriage 12 to reciprocate on rollers 38 and 40 riding in bearing way 36 and the corresponding rollers that engage in bearing way 34.

Figure 2:
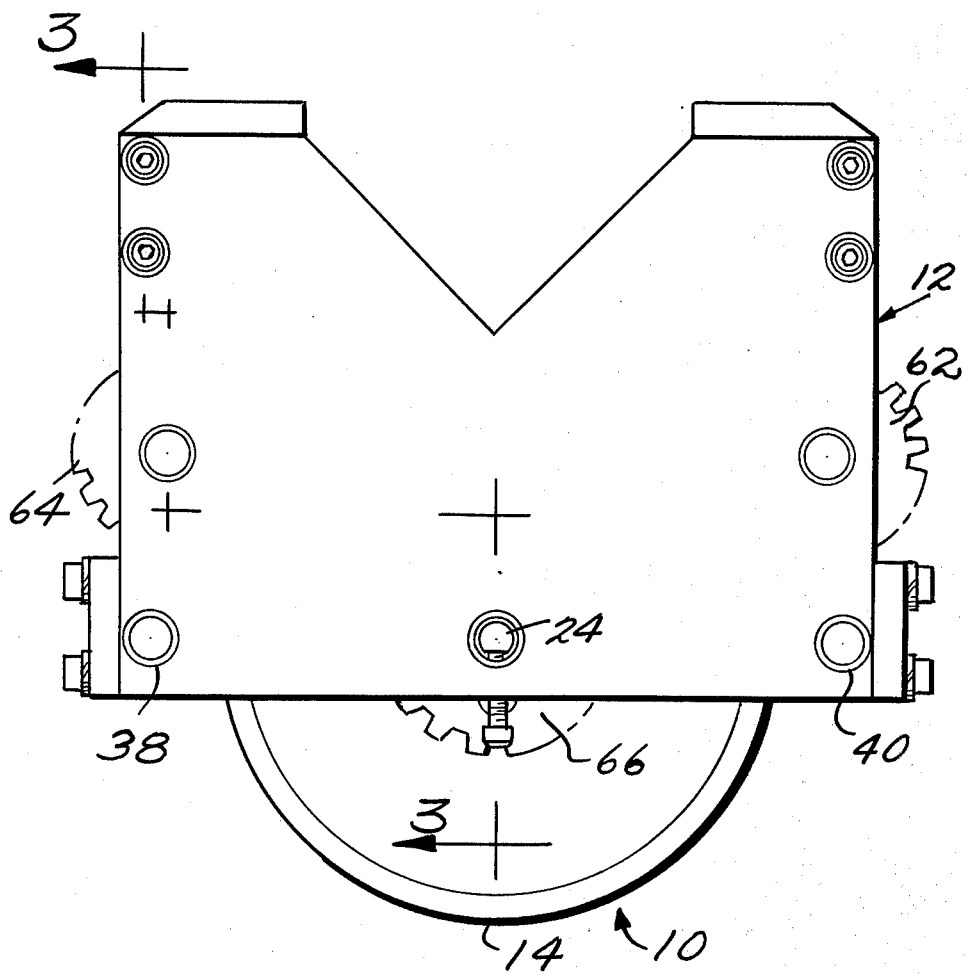
FIG. 2 is a detailed front elevation of the carriage means for supporting and driving the knife blade.
Figure 3:
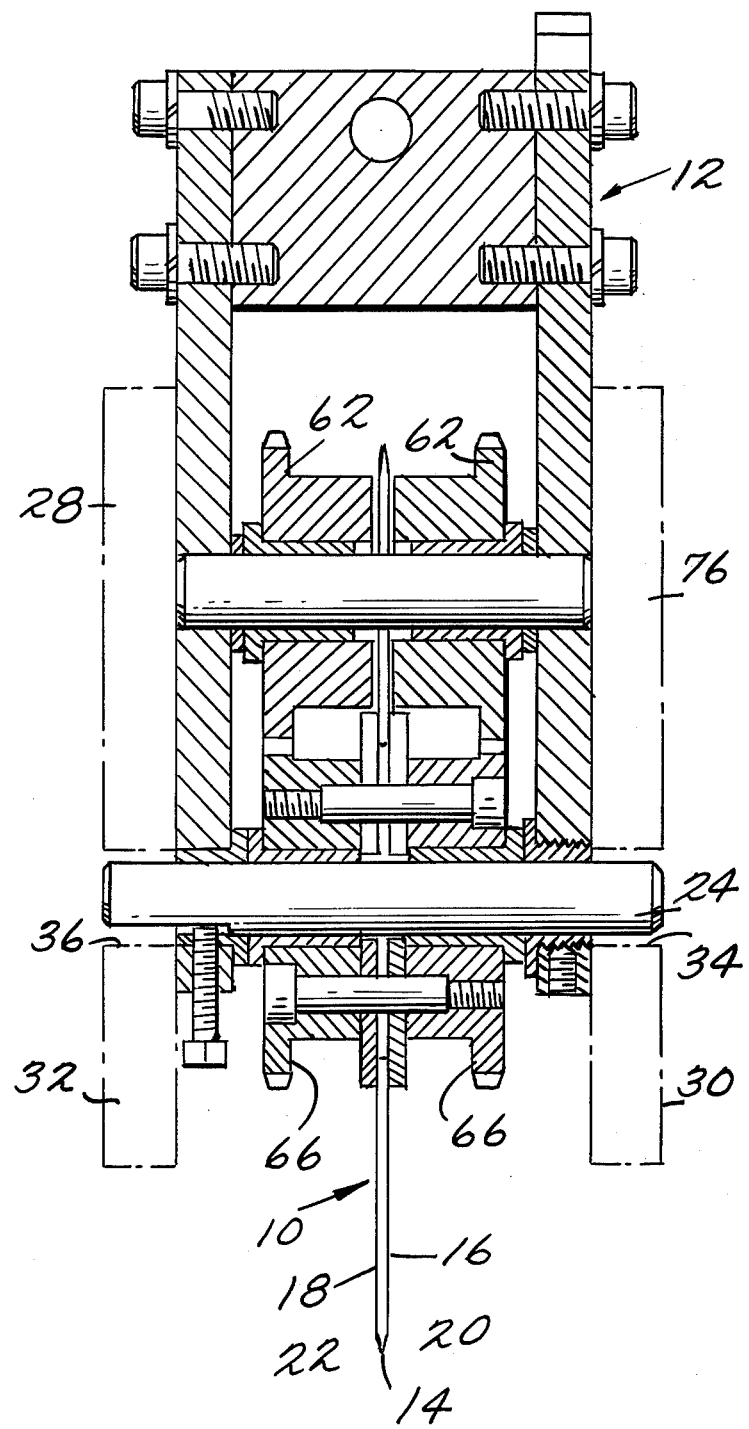
FIG. 3 is a sectional view of the knife supporting carriage taken on line 3—3 of FIG. 2.

As best seen in FIGS. 2 and 3, the carriage has a pair of identical sprocket wheels 62 rotatably mounted on one side thereof and a cooperating pair of identical sprocket wheels 64 rotatably mounted on the other side of the carriage. The pairs of idler sprocket wheels 62 and 64 are disposed above the axle 24 and are spaced apart equally on opposite sides of the axle as seen in FIG. 2. The axle has a pair of sprocket wheels 66 rotatably mounted thereon, the wheels 66 being bolted together with suitable mounting means therebetween to connect sprocket wheels 66 together as an integral unit with each other and with the mounting discs and knife blade 10. The sprocket wheels 62, 64 and 66 on each side of the knife as seen in FIG. 3 are in alignment with each other and are adapted to cooperate with a pair of spaced apart sprocket chains 68 best seen in FIG. 1. The chains 68 are attached at their right hand ends to adjusting bolts 70 and at their other ends to adjusting bolts 72. The main portions of the chains extend horizontally in a fixed position but have a sufficient length to form a loop by passing over sprocket wheels 62, under sprocket wheels 66 and over sprocket wheels 64.

With the construction described above, it is apparent that as the carriage 12 is driven to the left, referring to FIG. 1, the relatively stationary chains 68 cause sprockets 66 to rotate the knife blade to cut the layer rubber material 42 as the carriage moves the rotating knife across the machine from one edge of the strip to the other. As the rotary knife cuts its way across the strip, the annular abrasive sections 20 and 22 scrub and buff the severed surfaces that are in immediate contact with the sides of the knife. With the construction described above, by a selection of knife diameter and diameter of sprocket wheel 66, the peripheral speed of the knife can be controlled to be in a ratio to the cross speed feed of the carriage. No matter how fast or slow the carriage may move, the same relative speed of these two parts of the machine will remain constant so that the desired abrading and buffing action is properly completed. It is preferred that the peripheral buffing and cutting action be performed by rotating the blade to produce a peripheral cutting speed at least twice as fast as the actual horizontal speed of movement of the carriage across the strip.

In practice, the carriage is driven by the motor under the control of the operator in such a manner that operation of one push button (not shown) drives the carriage in one direction and operation of another push button (not shown) drives the carriage in the other direction.

It is apparent that the movement of the carriage back and forth across the sliding bearing support in the frame, can be automated by using cam surfaces 74 and 76 on top of the carriage that cooperate with suitable microswitch means 78 for example, engaged on cam 74 at one end and other switch that may be adjustably positioned to cooperate with the cam 76 on the carriage at the other end of its path. The drive motor may be automatically reversed as desired and coordinated with automatic strip measuring and feeding means to position the strip to be cut for severing the desired lengths of tread material to be vulcanized onto a casing.

It is also apparent that the movement of the tread with respect to the fixed blade position is an alternate application of the principle described herein.

Slitting treads lengthwise can create a narrower tread width if needed or provide means, with a center splice of two lengthwise slit pieces to provide wider treads than the original strips.

It is seen that with the above described knife means, that the cutting action is accomplished simultaneously with the scrubbing of the severed ends of the strip which buffed ends are to be vulcanized together on a tire casing. The strip is simultaneously severed while the severed ends or edges are buffed thereby speeding up the application of the tread to the casing. While the above describes the preferred forms of my invention, it should be understood that modifications thereof may occur to those skilled in the art that will fall within the scope of the following claims.

I claim:

1. Apparatus for severing a length from a strip of cured rubber tire tread comprising: a vertically disposed circular knife blade having an annular buffing zone containing abrasive grit extending inwardly from the peripheral cutting edge toward the center of the blade and projecting axially beyond the cutting edge for buffing a cut end of the strip simultaneously with the cutting of the strip; carriage means for rotatably supporting said blade, said carriage including vertical side walls parallel to and axially spaced from said blade, an axle for said blade mounted in said side walls near the lower edge thereof so that the cutting edge of said blade projects below said side walls; a frame for supporting said carriage for reciprocal movement along a horizontal path, said frame including horizontally spaced-apart stationary frame members extending along said path, said members being slidably engaged by the side walls of said carriage, said members defining a horizontal slot on each side of said carriage, and bearing means carried by said carriage side walls and riding in said slots; means for reciprocating said carriage along said horizontal path; and means for rotating said circular blade during horizontal movement of said carriage, said means including a sprocket wheel coaxial with and fixed to said blade, a pair of idler sprockets rotatably mounted on axles extending between the side walls of said carriage at locations fore and aft of said blade with respect to said horizontal path, and a stationary run of sprocket chain supported at its opposite ends by said frame, said chain extending between said carriage side walls and being threaded between said sprocket wheel and each of said idler sprockets.

2. Apparatus for cutting off from a strip of cured rubber tread strip a length of predetermined longitudinal dimension for use in retreading a tire and for simultaneously roughening the freshly cut end of both the strip and the length, said apparatus comprising: a carriage mounted in a stationary frame for reciprocating movement back and forth along a path across the longitudinal dimension of the tread strip; means for reciprocating said carriage along said path; a disc-like circular cutting blade mounted for rotation about its axis and supported by said carrier for movement therewith, said blade having side walls which converge at the periphery of the blade thereby forming a circular knife edge, each side wall having an annular zone containing abrasive grit extending from the circular knife edge toward the center and projecting axially beyond the knife edge; and means for rotating said blade at a peripheral speed which is higher than the speed at which said blade is moved along said path whereby said annular grit-containing zones roughen the ends of the strip and the length as the latter is severed from the strip.

* * * * *